United States Patent [19]

Lui

[11] Patent Number: 4,684,501
[45] Date of Patent: Aug. 4, 1987

[54] COMPLIANT INSERTS MOUNTED IN UPPER TIE PLATE OF BWR FUEL ASSEMBLY

[75] Inventor: Chun K. Lui, Monroeville Boro, Pa.

[73] Assignee: Westinghouse Electric Corp., Pittsburgh, Pa.

[21] Appl. No.: 802,560

[22] Filed: Nov. 27, 1985

[51] Int. Cl.⁴ .................................................. G21C 3/32
[52] U.S. Cl. .................... 376/446; 376/441; 376/442
[58] Field of Search ........................ 376/446, 441, 442

[56] References Cited

U.S. PATENT DOCUMENTS 3,733,252  5/1973  Georges ............................ 376/446
3,801,452  4/1974  Milburn ............................ 376/442

Primary Examiner—Donald P. Walsh

[57] ABSTRACT

A fuel assembly has a plurality of elongated fuel rods, a plurality of grid structures axially spaced from one another along the fuel rods between opposite ends thereof and supporting the fuel rods in a side-by-side spaced array, and a pair of tie plates disposed at the respective opposite ends of the fuel rods. Each of the fuel rods has a pair of end plugs sealing opposite ends thereof, with at least the end plug at one of the opposite ends of each fuel rod having an extension member thereon which extends axially outward from the end plug and is of a diameter less than that of the fuel rod. At least one of the tie plates has a plurality of holes defined by endless sidewalls formed therethrough between opposite sides of the tie plate and in an array which matches that of the fuel rods. A compliant insert is disposed in each hole in the one tie plate and engaged with the tie plate and the end plug extension member so as to yieldably support the extension member within the hole in spaced relationship from the hole sidewall. The compliant insert includes a plurality of spring members. In one embodiment, the spring members are separate from one another, whereas in another embodiment, the spring members are integrally connected to one another.

22 Claims, 9 Drawing Figures

COMPLIANT INSERTS MOUNTED IN UPPER TIE PLATE OF BWR FUEL ASSEMBLY

BACKGROUND OF THE INVENTION

1. Field of the Invention

The present invention relates generally to fuel assemblies for a nuclear reactor and, more particularly, is concerned with compliant inserts mounted within holes in the upper tie plate of a BWR fuel assembly for supporting the upper end plug extensions of assembly fuel rods so as to prevent binding and axial loading of the fuel rods.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a boiling water reactor (BWR) the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. The outer flow channel extends along substantially the entire length of the fuel assembly and interconnects a top nozzle with a bottom nozzle. A hollow water cross extends axially through the outer channel so as to provide an open inner channel for subcooled moderator flow through the fuel assembly and to divide the fuel assembly into four, separate, elongated compartments, each containing an identical mini-bundle of the fuel rods. The bottom nozzle fits into the reactor core support plate and serves as an inlet for coolant flow into the outer channel of the fuel assembly. Coolant enters through the bottom nozzle and thereafter flows through the water cross and along the fuel rods removing energy from their heated surfaces.

The fuel rods of each mini-bundle extend in laterally spaced apart relationship between an upper tie plate and a lower tie plate and connected together with the tie plates comprises a separate fuel rod subassembly within each of the compartments of the channel. A plurality of grids axially spaced along the fuel rods of each fuel rod subassembly maintain the fuel rods in their laterally spaced relationships. The water cross has approximately the same axial length as the fuel rod subassemblies, extending between the upper and lower tie plates thereof.

In each fuel rod subassembly of the BWR fuel assembly, the mini-bundle of fuel rods is composed of standard fuel rods and tie rods. Such use of standard and tie fuel rods is conventional, as can be seen in BWR fuel bundles illustrated in U.S. patents to Qurnell et al (U.S. Pat. No. 3,741,868) and Smith et al (U.S. Pat. No. 4,022,661). Ordinarily, the tie rods have extensions with nuts on the ends thereof which limit movement within holes in the upper tie plate, whereas the standard fuel rods have upper end plug extensions which are slidably received within holes in the plate. The upper tie plate is positioned axially by the tie rods, whereas the top ends of all the fuel rods, including the tie rods, are positioned and supported laterally by the upper tie plate via the pattern of holes defined therein.

Since thermal and irradiation growth rates may be different between the tie rod and the standard fuel rod, especially in fuel assembly designs where the fuel cladding is made of cold-worked Ziracaloy, the end plug extension on the standard fuel rod must slide freely in its receiving hole in the upper tie plate to accommodate relative growth in length between the tie and standard fuel rods. Otherwise, binding and an axial load in the fuel rod would result, which leads to bowing of the fuel rod.

Consequently, a need exists for a way to prevent binding of the upper end plug extension within the upper tie plate hole in order to avoid axial loading and resultant bowing of the fuel rod.

SUMMARY OF THE INVENTION

The present invention provides a compliant insert for supporting the end plug extension in the tie plate hole in a manner which is designed to satisfy the aforementioned needs. The compliant insert of the present invention provides a solution to the binding problem in the upper tie plate holes by interposing resiliently flexible spring support members within the respective hole (after being slightly enlarged in diameter) between the end plug extension and the hole sidewall which will accommodate relative angular movement between the end plug extension and tie plate, such as due to tilting of the tie plate relative to the plug extension, while still allowing axial movement of one relative to the other. Although, spring-type members have been incorporated heretofore in fuel assembly grids or spacers for engaging fuel rods to support them in a desired array, such as disclosed in U.S. patents to Ashcroft et al (U.S. Pat. No. 3,361,639), Milburn (U.S. Pat. No. 3,801,452) and Amaral et al (U.S. Pat. No. 4,089,742), the art has failed to either perceive the above-described binding problem existing heretofore between the fuel rod end plug extension and upper tie plate or the possibility of using a compliant insert as the solution thereof.

Accordingly, the present invention is set forth in a fuel assembly having a plurality of fuel rods, a plurality of grid structures axially spaced from one another along the fuel rods and supporting the fuel rods in a side-by-side spaced array, and tie plates disposed at opposite ends of the fuel rods. At least one of the tie plates has a plurality of holes defined by endless sidewalls formed therethrough between opposite sides of the tie plate and in an array which matches that of the fuel rods. Each of the fuel rods has a pair of end plugs sealing opposite ends thereof with at least one of the end plugs having an extension member thereon which extends axially outward therefrom. The present invention relates to a compliant insert disposed in each of the holes of the one tie plate and including a plurality of spring members engaged with the tie plate and the end plug extension member so as to support the extension member within the hole in spaced relationship from the hole sidewall. In one embodiment, the spring members are separate from one another, whereas in another embodiment, they are integrally connected to one another.

More particularly, each of the spring members has opposite end portions disposed along opposite sides of the tie plate adjacent to the tie plate hole. In one embodiment, the opposite end portions are tabs being bendable between axially-extending releasing and radially-extending securing positions. In addition, means are provided for securing the opposite end portions of each spring member to the respective sides of the tie plate. In one embodiment, the securing means are indentations formed in the respective sides of the tie plate into which the opposite end portions of the spring members extend. In another embodiment, the securing means are welds which interconnect the opposite end portions of the spring members to the respective sides of the tie plate.

Still further, each of the spring members has an elongated middle portion extending through the plate hole between the hole sidewall and the extension member, and resilient means defined on each spring member middle portion engaging and positioning the extension member in spaced relationship from the hole sidewall. In one embodiment, the resilient means is a single inwardly-protruding dimple formed on the middle portion of the spring member. In another embodiment, the resilient means is a pair of tandemly-arranged inwardly-protruding dimples formed on the middle portion of the spring member.

Also, the present invention relates to the combination in a fuel assembly, comprising: (a) a plurality of elongated fuel rods, each of the fuel rods having a pair of end plugs sealing opposite ends thereof, at least the end plug at one of the opposite ends of each fuel rod having an extension member thereon which extends axially outward from the end plug and is of a diameter less than that of the fuel rod; (b) a plurality of grid structures axially spaced from one another along the fuel rods between the opposite ends thereof and supporting the fuel rods in a side-by-side spaced array; (c) a pair of tie plates disposed at the respective opposite ends of the fuel rods, at least one of the tie plates having a plurality of holes defined by endless sidewalls formed therethrough between opposite sides of the tie plate and in an array which matches that of the fuel rods; and (d) a compliant insert disposed in each of the holes of the one tie plate and engaged with the tie plate and the end plug extension member so as to yieldably support the extension member within the hole in spaced relationship from the hole sidewall.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings, in which.

DETAILED DESCRIPTION OF THE INVENTION

Figure 1:
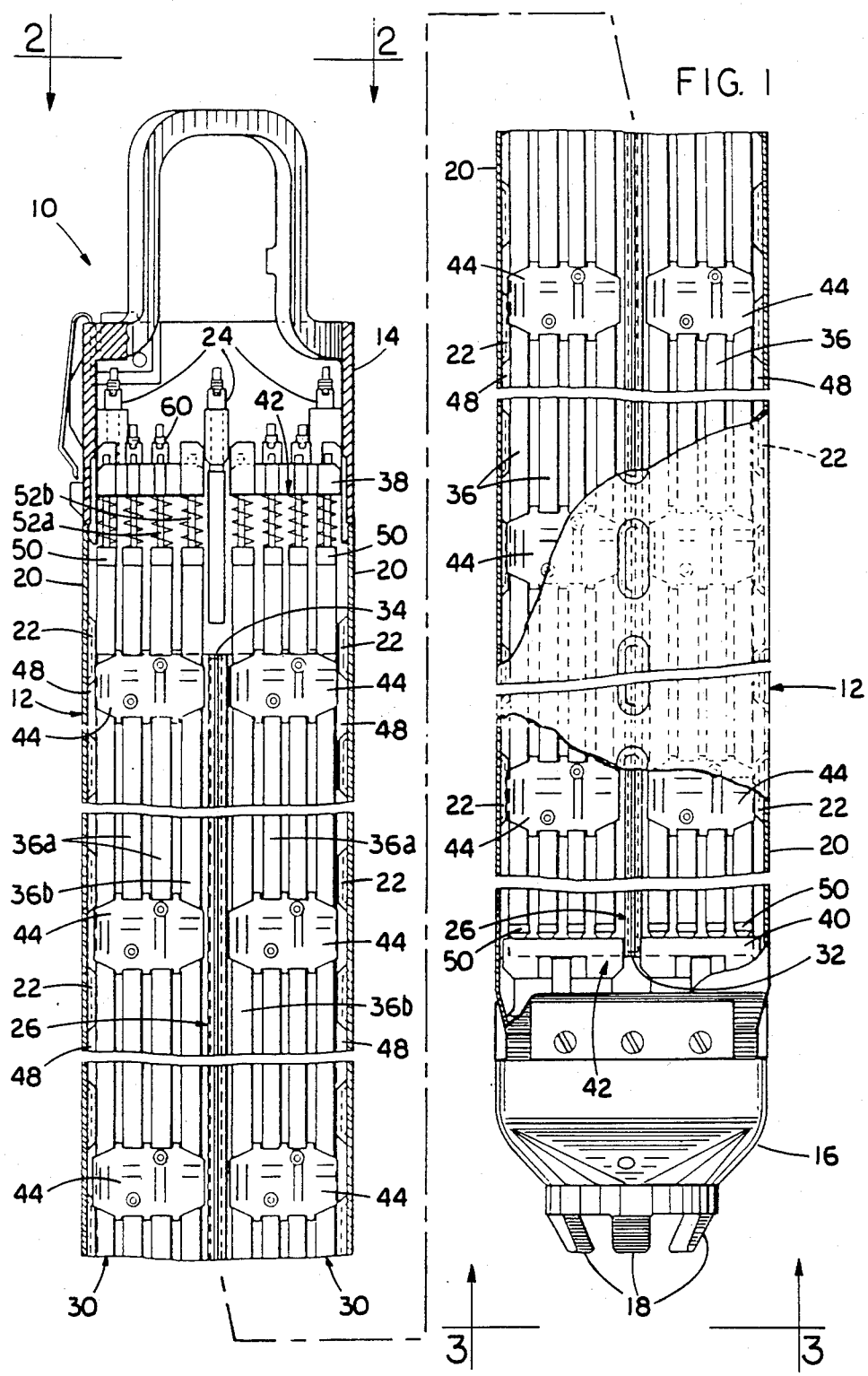
FIG. 1 is an elevational view, with parts broken away and sectioned for clarity, of a BWR nuclear fuel assembly in which the improved feature of the present invention is employed.
Figure 2:
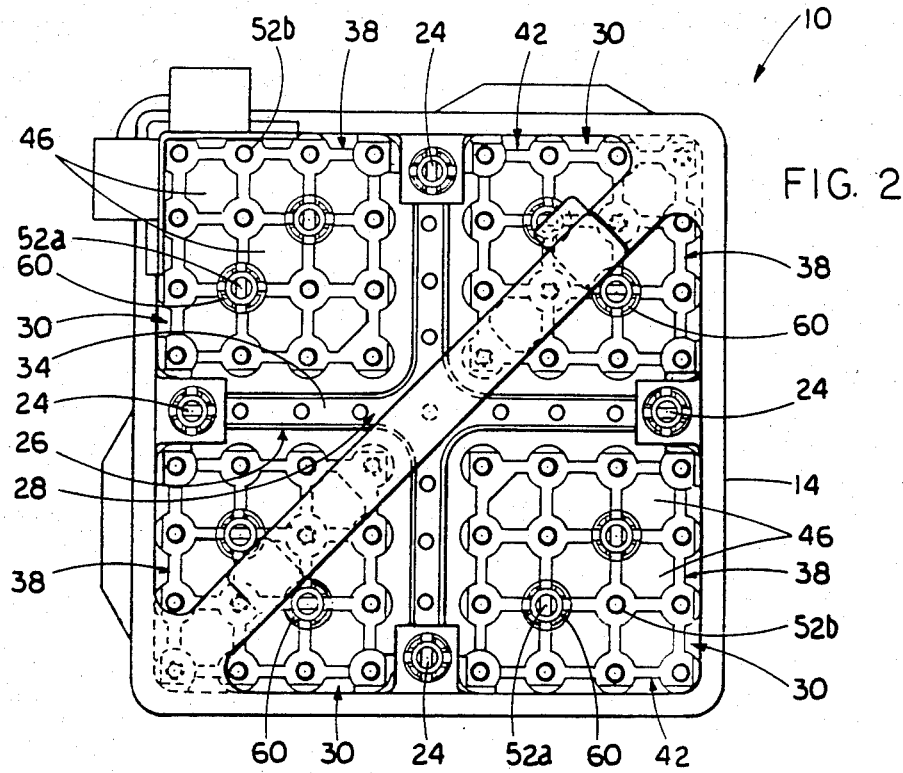
FIG. 2 is an enlarged top plan view of the fuel assembly as seen along line 2—2 of FIG. 1.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 3:
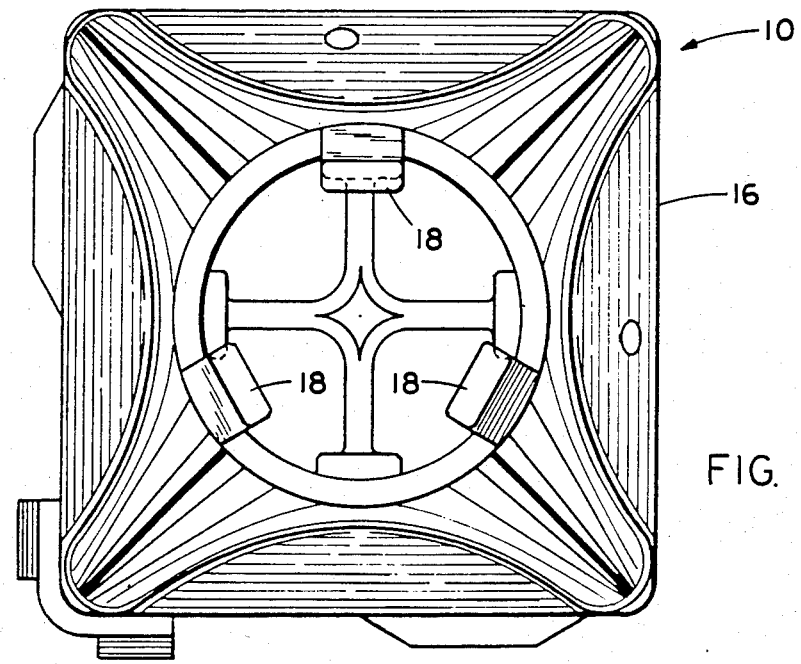
FIG. 3 is an enlarged bottom plan view of the fuel assembly as seen along line 3—3 of FIG. 1.

Referring now to the drawings, and particularly in FIGS. 1 and 3, there is shown a nuclear fuel assembly, generally designated 10 for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross 26 extends axially through the outer channel 12 so as to provide an open cruciform inner channel 28 for subcooled moderator flow through the fuel assembly 10 and to divide the fuel assembly into four, separate, elongated compartments 30. The hollow water cross 26 is mounted to the angularly-displaced walls 20 of the outer channel 12. Preferably, the outer, elongated lateral ends of the water cross 26 are connected such as by welding to the structural ribs 22 along the lengths thereof in order to securely retain the water cross 26 in its desired central position within the fuel assembly 10. Also, the water cross 26 has a lower flow inlet end 32 and an opposite upper flow outlet end 34 which each communicate with the inner channel 28 for providing subcoolant flow therethrough.

Disposed within the channel 12 is a bundle of fuel rods 36 which, in the illustrated embodiment, number sixty-four and form an 8×8 array. The fuel rod bundle is, in turn, separated into four mini-bundles thereof by the water cross 26. The fuel rods 36 of each mini-bundle, such being sixteen in number in a 4×4 array, extend in laterally spaced apart relationship between an upper tie plate 38 and a lower tie plate 40. The fuel rods in each mini-bundle are connected to the upper and lower tie plates 38,40 and together therewith comprise a separate fuel rod subassembly 42 within each of the compartments 30 of the channel 12. A plurality of grids or spacers 44 axially spaced along the fuel rods 36 of each fuel rod subassembly 42 maintain the fuel rods in their laterally spaced relationships. The lower and upper tie plates 38,40 of the respective fuel rod subassemblies 42 have flow openings 46 defined therethrough for allowing the flow of the coolant fluid into and from the separate fuel rod subassemblies. Also, coolant flow paths provide flow communication between the fuel rod subassemblies 42 in the respective separate compartments 30 of the fuel assembly 10 through a plurality of openings 48 formed between each of the structural ribs 22 along the lengths thereof. Coolant flow through the openings 48 serves to equalize the hydraulic pressure betweent he four separate compartments 30, thereby minimizing the possibility of thermal hydrodynamic instability between the separate fuel rod subassemblies 42.

Compliant Inserts In Upper Tie Plate Holes

Figure 4:
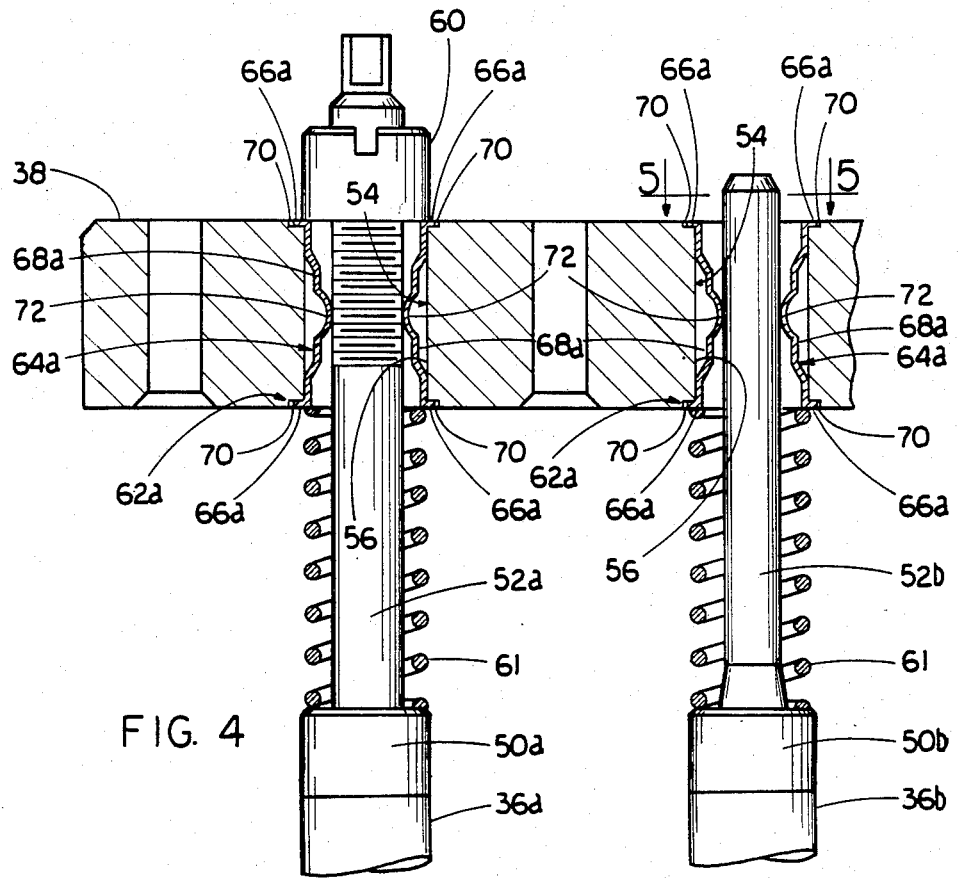
FIG. 4 is an enlarged fragmentary detailed elevational view, partly in section, of the fuel assembly of FIG. 1, showing a portion of the upper tie plate of the assembly with a first embodiment of the compliant insert of the present invention mounted in each of two of the holes in the tie plate and disposed between the hole sidewalls and the upper end plug extensions of two of the tie and standard fuel rods of the assembly which extend through the holes so as to support the plug extensions.

Turning now to FIGS. 4 to 9, there is shown several embodiments of a combination of features of the present invention for supporting the upper ends of the fuel rods 36 so as to avoid binding and axially loading thereof which heretofore has frequently resulted in bowing of the fuel rods. As depicted in FIG. 4, each of the fuel rods 36 is one of two types: the tie rod 36a or the standard fuel rod 36b. Each has a pair of end plugs 50a,50b (only the upper one being shown) sealing opposite ends thereof. The upper end plugs 50a,50b of the fuel rods 36a,36b have respective extension members 52a,52b thereon which extends axially outward from the end plugs and have respective diameters less than that of each fuel rod.

Also, as seen in FIG. 4, the upper tie plate 38 disposed adjacent the upper ends of the fuel rods 36a,36b has a plurality of holes 54 defined by endless sidewalls 56 formed therethrough between opposite upper and lower sides 58 of the upper tie plate. The holes 54 are arranged in an array which matches that of the fuel rods 36. The extension member 52a of the tie rod 36a is threaded and fastened by a nut 60 so as to limit its movement within one of the holes 54 in the upper tie plate 38, whereas the extension member 52b of the standard fuel rod 36b is slidably received within another one of the holes 54 in the tie plate. In the case of each fuel rod 36, there is a compressed coil spring 61 disposed above the extension member 52 and extending between the respective end plug 50 and the upper tie plate 38. The springs 61 force the tie plate 38 upwardly against the nut 60 on the tie rod 36a.

The holes 54 are substantially larger in diameter than the respective end plug extension members 52a,52b of the fuel rods 36a,36b for accommodating insertion of a compliant insert, generally designated 62, in each of the holes 54 of the upper tie plate 38. There are three different embodiments of the insert 62 disclosed, each being modified slightly from the other. However, basically, all embodiments of the compliant insert 62 function to engage both the tie plate 38 and the respective end plug extension member 52 so as to yieldably support the extension member within the given hole 54 in spaced relationship from the hole sidewall 56. Also, each embodiment of the compliant insert 62 includes a plurality of spring members 64.

Figure 5:
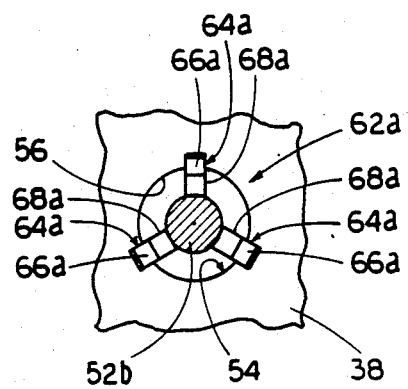
FIG. 5 is a top plan view of one of the compliant inserts and respective upper end plug extension as seen along line 5—5 of FIG. 4.

Turning initially to the first embodiment depicted in FIGS. 4 and 5, it will be seen that the spring members 64a making up the compliant insert 62a are separate from one another, being angularly spaced apart approximately 120 degrees about the hole 54. Each of the spring members 64a is made from a strip of resiliently flexible material which is also creep resistant, such as Inconel. Each spring member 64a has opposite upper and lower end portions 66a and a middle portion 68a interconnecting the opposite end portions. The opposite end portions 66a in the form of tabs are disposed along the opposite sides 58 of the tie plate 38 adjacent to the respective tie plate hole 54. In addition, means are provided for securing the opposite end portions 66a of each spring member 64a to the respective sides 58 of the tie plate 38. In the first embodiment of FIG. 4, such means take the form of tackwelds 70 which interconnect the spring member end portions 66a to the tie plate 38. The elongated middle portion 68a of each spring member 64a extends through the tie plate hole 54 between the hole sidewall 56 and the respective one of extension members 52a,52b. Resilient means is defined on each spring member middle portion 68a for engaging and positioning the respective extension member 52a,52b in spaced relationship from the hole sidewall 56. In the first embodiment of FIG. 4, such resilient means is in the form of a single inwardly-protruding dimple 72 formed on each spring member 64a.

In view of the above-described arrangement, the spring members 64a of the insert 62a will yield and prevent binding of the respective end plug extension member 52a,52b upon tilting of the tie plate 38 relative to the plug extension member. They will also support the extension member so as to eliminate lateral vibrations thereof, while at the same time allow the end plug extension member to freely slide relative to the upper tie plate.

Figures 6, 7:
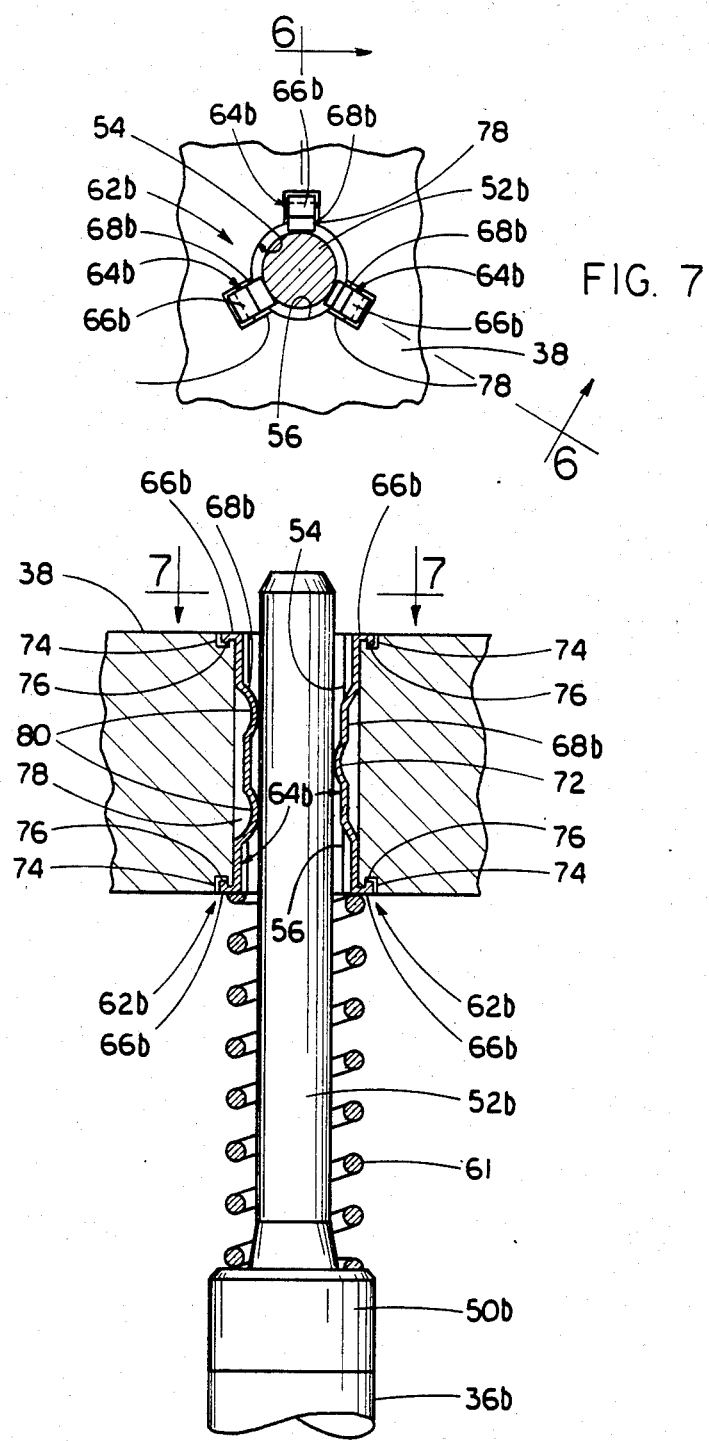
FIG. 6 is an enlarged fragmentary detailed elevational view, partly in section, of the fuel assembly of FIG. 1, showing a portion of the upper tie plate of the assembly with a second embodiment of the compliant insert of the present invention being applied to the tie plate in a way generally similar to that seen in FIG. 4 with respect to the first embodiment of the insert.
FIG. 7 is a top plan view of the compliant insert and upper end plug extension as seen along line 7—7 of FIG. 6.

The alternative embodiment of the compliant insert 62b seen in FIGS. 6 and 7 is generally similar to the first embodiment of FIGS. 4 and 5. Therefore, only the difference between the two will be described. The opposite end portions or tabs 66b of the separate spring members 64b are secured to the respective sides 58 of the upper tie plate 38 by means of cutouts or indentations 74 formed therein into which turned ends 76 on the tabs 66b extend. Also, angularly-spaced recesses 78 are formed in the hole sidewall 56 in which the middle portions 68b of the spring members 64b are seated to maintain the circumferential positioning of the spring members in the hole 54. Further, the resilient means of the insert 62b is a combination of the single inwardly-protruding dimple 72 formed on one spring member middle portion 68b and a pair of tandemly-arranged inwardly-protruding dimples 80 formed on one of the other spring member middle portions 68b. The pair of bi-level dimples 80 provide more resistance to fuel rod tilting if that should be desired in a particular case.

Figure 8:
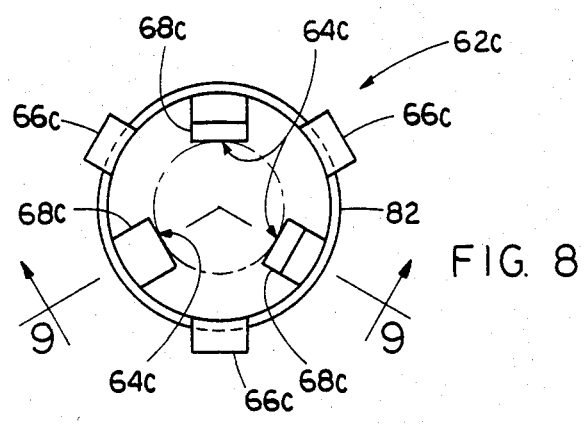
FIG. 8 is a top plan view of a third embodiment of the compliant insert of the present invention as seen along line 8—8 of FIG. 9.
Figure 9:
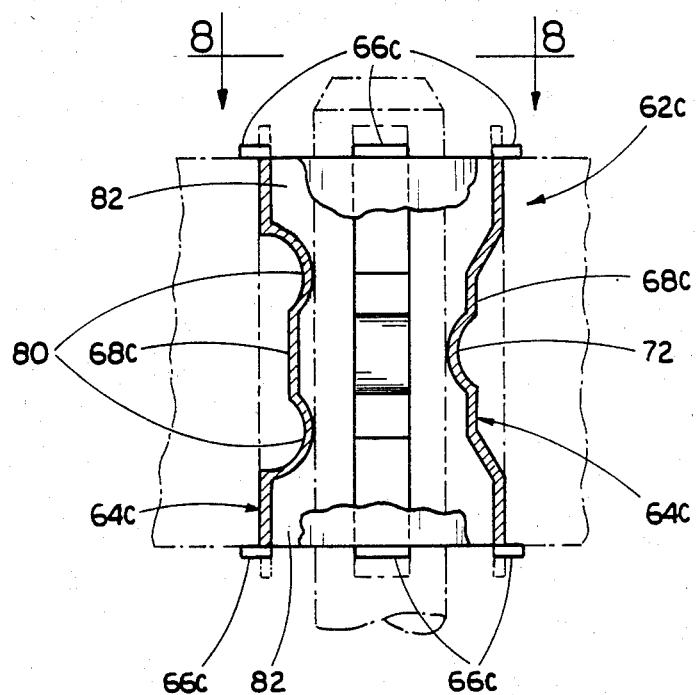
FIG. 9 is an elevational view of the third embodiment of the compliant insert as seen along line 9—9 of FIG. 8.

In another alternative embodiment of the compliant insert 62c seen in FIGS. 8 and 9, the spring members 64c are integrally connected to one another by spaced apart upper and lower ring portions 82. Here, the opposite end portions or tabs 66c are connected to the respective ring portions and circumferentially displaced from the middle portions 68c of the spring members 64c. The tabs 66c are also bendable between axially-extending releasing positions, seen in dotted outline form, and radially-extending securing positions, seen in full line form, in FIG. 9. The integral structure of the spring members 64c allows the insert 62c to anchor itself in the tie plate hole 54.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a fuel assembly having a plurality of fuel rods, a plurality of grid structures axially spaced from one another along said fuel rods and supporting said fuel rods in a side-by-side spaced array, and tie plates disposed at opposite ends of said fuel rods, at least one of said tie plates having a plurality of holes defined by endless sidewalls formed therethrough between opposite sides of said tie plate and in an array which matches that of said fuel rods, each of said fuel rods having a pair of end plugs sealing opposite ends thereof, at least one of said end plugs having an extension member thereon which extends axially outward therefrom, a compliant insert comprising:

a plurality of spring members disposed in each of said holes of said one tie plate and engaged with said tie plate and said end plug extension member so as to support said extension member within said hole in spaced relationship from said hole sidewall, said spring members being resiliently flexible for accommodating relative angular movement between said each end plug extension member and said tie plate and, at the same time, allowing axial movement of one relative to the other; and a plurality of tabs interconnected with opposite ends of said spring members and disposed outside of each hole along opposite sides of said tie plate adjacent to each hole for securing said spring members within said holes of said tie plate.

2. The fuel assembly as recited in claim 1, wherein said spring members are separate from one another.

3. The fuel assembly as recited in claim 1, wherein said spring members are integrally connected to one another.

4. The fuel assembly as recited in claim 1, wherein said tabs are bendable between axially-extending releasing and radiallyextending securing positions.

5. The fuel assembly as recited in claim 1, further comprising:
means securing said tabs to said respective sides of said tie plate.

6. The fuel assembly as recited in claim 5, wherein said securing means are indentations formed in said respective sides of said tie plate into which said tabs extend.

7. The fuel assembly as recited in claim 5, wherein said securing means are welds which interconnect said tabs to said respective sides of said tie plate.

8. The fuel assembly as recited in claim 1, wherein each of said spring members has an elongated middle portion extending through said tie plate hole between said hole sidewall and said extension member, are resilient means defined on each spring member middle portion engaging and positioning said extension member in spaced relationship from said hole sidewall.

9. The fuel assembly as recited in claim 8, wherein said resilient means is a single inwardly-protruding dimple formed on said middle portion of said spring member.

10. The fuel assembly as recited in claim 8, wherein said resilient means is a pair of tandemly-arranged inwardly-protruding dimples formed on said middle portion of said spring member.

11. The fuel assembly as recited in claim 8, wherein said resilient means on said middle portion of one of said spring members is a single inwardly-protruding dimple formed thereon, whereas said resilient means of said middle portion of another of said spring members is a pair of tandemly-arranged inwardly-protruding dimples formed thereon.

12. In a fuel assembly, the combination comprising:
(a) a plurality of elongated fuel rods, each of said fuel rods having a pair of end plugs sealing opposite ends thereof, at least said end plug at one of said opposite ends of said each fuel rod having an extension member thereon which extends axially outward from said end plug and is of a diameter less than that of said fuel rod;
(b) a plurality of grid structures axially spaced from one another along said fuel rods between said opposite ends thereof and supporting said fuel rods in a side-by-side spaced array;
(c) a pair of tie plates disposed at said respective opposite ends of said fuel rods, at least one of said tie plates having a plurality of holes defined by endless sidewalls formed therethrough between opposite sides of said tie plate and in an array which matches that of said fuel rods; and
(d) a compliant insert disposed in each of said holes of said one tie plate and engaged with said tie plate and said end plug extension member so as to yieldably support said extension member within said hole in spaced relationship from said hole sidewall, said each compliant insert including
(i) a plurality of spring members disposed in each of said holes of said one tie plate and engaged with said tie plate and said end plug extension member so as to support said extension member within said hole in spaced relationship from said hole sidewall, said spring members being resiliently flexible for accommodating relative angular movement between said each end plug extension member and said tie plate and, at the same time, allowing axial movement of one relative to the other; and (ii) a plurality of tabs interconnected with opposite ends of said spring members and disposed outside of each hole along opposite sides of said tie plate adjacent to each hole for securing said spring members within said holes of said tie plate.

13. The fuel assembly as recited in claim 12, wherein said spring members are separate from one another.

14. The fuel assembly as recited in claim 12, wherein said spring members are integrally connected to one another.

15. The fuel assembly as recited in claim 12, wherein said tabs are bendable between axially-extending releasing and radially-extending securing positions.

16. The fuel assembly as recited in claim 12, further comprising:
means securing said tabs to said respective sides of said tie plate.

17. The fuel assembly as recited in claim 16, wherein said securing means are indentations formed in said respective sides of said tie plate into which said tabs extend.

18. The fuel assembly as recited in claim 16, wherein said securing means are welds which interconnect said tabs to said respective sides of said tie plate.

19. The fuel assembly as recited in claim 12, wherein each of said spring members has an elongated middle portion extending through said tie plate hole between said hole sidewall and said extension member, and resilient means defined on each spring member middle portion engaging and positioning said extension member in spaced relationship from said hole sidewall.

20. The fuel assembly as recited in claim 19, wherein said resilient means is a single inwardly-protruding dimple formed on said middle portion of said spring member.

21. The fuel assembly as recited in claim 19, wherein said resilient means is a pair of tandemly-arranged inwardly-protruding dimples formed on said middle portion of said spring member.

22. The fuel assembly as recited in claim 19, wherein said resilient means on said middle portion of one of said spring members is a single inwardly-protruding dimple formed thereon, whereas said resilient means on said middle portion of another of said spring members is a pair of tandemly-arranged inwardly-protruding dimples formed thereon.

* * * * *